United States Patent
Kumar et al.

(10) Patent No.: US 9,781,000 B1
(45) Date of Patent: Oct. 3, 2017

(54) STORAGE MOBILITY USING LOCATOR-IDENTIFIER SEPARATION PROTOCOL

(71) Applicant: EMC Corporation, Hopkinton, MA (US)

(72) Inventors: Suresh Kumar, Sunnyvale, CA (US); Kenneth Durazzo, San Ramon, CA (US); Xiaohong Qin, Saratoga, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 273 days.

(21) Appl. No.: 14/578,582

(22) Filed: Dec. 22, 2014

(51) Int. Cl.
*G06F 15/16* (2006.01)
*H04L 12/24* (2006.01)
*H04L 29/06* (2006.01)

(52) U.S. Cl.
CPC .......... *H04L 41/0813* (2013.01); *H04L 67/42* (2013.01)

(58) Field of Classification Search
CPC ............................ H04L 41/0813; H04L 67/42
USPC ........................................................ 709/203
See application file for complete search history.

(56) References Cited

U.S. PATENT DOCUMENTS 8,347,088 B2 * 1/2013 Moore ................... G06F 19/327 713/166
8,448,166 B2 * 5/2013 Nanda ................. G06F 9/44505 709/220
9,036,509 B1 * 5/2015 Addepalli ............ H04W 4/046 370/259
9,276,871 B1 * 3/2016 Freitas ................ H04L 61/2007
(Continued)

FOREIGN PATENT DOCUMENTS

WO 2010074512 A2 7/2010
WO 2013007130 A1 1/2013

OTHER PUBLICATIONS

D. Bernstein et al., "Blueprint for the Intercloud—Protocols and Formats for Cloud Computing Interoperability," IEEE Fourth International Conference on Internet and Web Applications and Services (ICIW), May 2009, pp. 328-336, Venice/Mestre, Italy.
(Continued)

*Primary Examiner* — Vivek Srivastava
*Assistant Examiner* — Atta Khan
(74) *Attorney, Agent, or Firm* — Ryan, Mason & Lewis, LLP (57) ABSTRACT

A processing device such as a router or other network device implements a locator-identifier mapping system associating identifiers of respective endpoints with respective locators in accordance with a locator-identifier separation protocol. A first one of the endpoints comprises a storage server associated with a storage array. In conjunction with reconfiguration of the storage server, the locator-identifier mapping system updates a particular one of the locators corresponding to the endpoint identifier of the storage server. The reconfiguration of the storage server may comprise, for example, a migration of the storage server within a given data center, or from a first data center to a second data center. The locator of the storage server illustratively specifies a subnet of the storage server. The processing device may comprise a router operating as at least one of an ingress tunnel router and an egress tunnel router in accordance with the locator-identifier separation protocol.

20 Claims, 8 Drawing Sheets

(56) References Cited

U.S. PATENT DOCUMENTS

| | | | |
|---|---|---|---|
| 2011/0261800 A1 | 10/2011 | You et al. | |
| 2012/0117030 A1* | 5/2012 | Sakuma | G06F 17/303 707/654 |
| 2012/0173513 A1* | 7/2012 | Agrawal | G06F 17/30448 707/716 |
| 2012/0314714 A1 | 12/2012 | Hu et al. | |
| 2013/0024553 A1* | 1/2013 | Mittal | H04L 41/0893 709/222 |
| 2013/0151680 A1* | 6/2013 | Salinas | G06F 17/30557 709/223 |
| 2013/0191477 A1 | 7/2013 | You et al. | |
| 2014/0301387 A1* | 10/2014 | Subramanian | H04L 45/02 370/389 |
| 2016/0065531 A1* | 3/2016 | Xiaopu | H04L 61/103 709/238 |
| 2016/0173405 A1* | 6/2016 | Freitas | H04L 61/2007 709/213 |

OTHER PUBLICATIONS

F. Hao et al., "Enhancing Dynamic Cloud-Based Services Using Network Virtualization," Proceedings of First ACM SIGCOMM Workshop on Virtualized Infrastructure Systems and Architecture (VISA), Aug. 2009, pp. 37-44, Barcelona, Spain.

D. Farinacci et al., "The Locator/ID Separation Protocol (LISP)," Internet Engineering Task Force (IETF), Request for Comments: 6830, Jan. 2013, 75 pages.

\* cited by examiner

FIG. 4
DATA CENTER WITHOUT LISP

EID-RLOC MAPPING DATABASE

| EID (IP ADDRESS OF NFS SERVER) | RLOC (SUBNET) | WEIGHT | TENANT-ID | PROFILE |
|---|---|---|---|---|
| 10.0.0.1 | 10.0.0.124 | 2 | 7789 | *PLATINUM* |
| 12.0.0.2 | 12.0.0.124 | 1 | 9870 | *GOLD* |

STORAGE MOBILITY USING LOCATOR-IDENTIFIER SEPARATION PROTOCOL

FIELD

The field relates generally to data centers and other types of information processing systems, and more particularly to techniques for implementing compute, storage and network resources in information processing systems.

BACKGROUND

A typical data center has a topology that is continually changing to accommodate expansion in compute, storage and network resources. Such changes can include upgrades or other reconfigurations of compute, storage and network resources, possibly involving movement of physical infrastructure components within a given data center or from one data center to another data center. Data center reconfigurations of this type can be particularly difficult under current practice, potentially leading to significant service disruptions. By way of example, a reconfiguration involving migration of storage resources within a data center or between data centers using existing techniques can require a data center administrator to schedule a service downtime, shut down all impacted resources, implement changes in network connections, test the network connections, and finally bring all the impacted resources back online. The downtime caused by such migration of storage resources can be highly disruptive to product and development environments.

SUMMARY

Illustrative embodiments of the present invention provide enhanced flexibility in reconfiguration of storage resources in data centers and other information processing systems through use of a locator-identifier separation protocol. For example, in some embodiments, significantly enhanced mobility is provided for storage resources associated with storage infrastructure of a data center.

In one embodiment, a processing device such as a router or other network device implements a locator-identifier mapping system configured to associate identifiers of respective endpoints with respective locators in accordance with a locator-identifier separation protocol. A first one of the endpoints comprises a storage server associated with a storage array. In conjunction with a reconfiguration of the storage server, the locator-identifier mapping system updates a particular one of the locators corresponding to the endpoint identifier of the storage server. The reconfiguration of the storage server may comprise, for example, a migration of the storage server within a given data center or from a first data center to a second data center. The locator corresponding to the endpoint identifier of the storage server illustratively specifies a subnet of the storage server. The processing device in some embodiments comprises a tunnel router configured to operate as at least one of an ingress tunnel router and an egress tunnel router in accordance with the locator-identifier separation protocol.

By way of example, the locator-identifier mapping system in one or more embodiments receives a first subscription request from the storage server, the subscription request specifying the endpoint identifier of the storage server and a current subnet of the storage server, and associates the endpoint identifier of the storage server with a locator specifying the current subnet of the storage server. Responsive to the migration or other reconfiguration of the storage server, the locator-identifier mapping system locks the storage server to prevent writes by any associated storage clients, receives a second subscription request from the storage server, the second subscription request specifying the endpoint identifier of the storage server and an updated subnet of the storage server, updates the locator corresponding to the endpoint identifier of the storage server to specify the updated subnet of the storage server, and unlocks the storage server to allow writes by any associated storage clients.

As noted above, illustrative embodiments described herein provide significant improvements relative to conventional arrangements. For example, in some of these embodiments, there is no need for storage clients to remount file system shares upon the migration or other reconfiguration of the corresponding storage server. Accordingly, downtime associated with storage migration or other reconfigurations of storage infrastructure is considerably reduced, leading to improved continuity of service within the system.

These and other illustrative embodiments described herein include, without limitation, methods, apparatus, systems, and articles of manufacture comprising processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising private and public cloud computing or storage systems, as well as other types of processing systems comprising physical or virtual processing resources in any combination.

Figure 1:
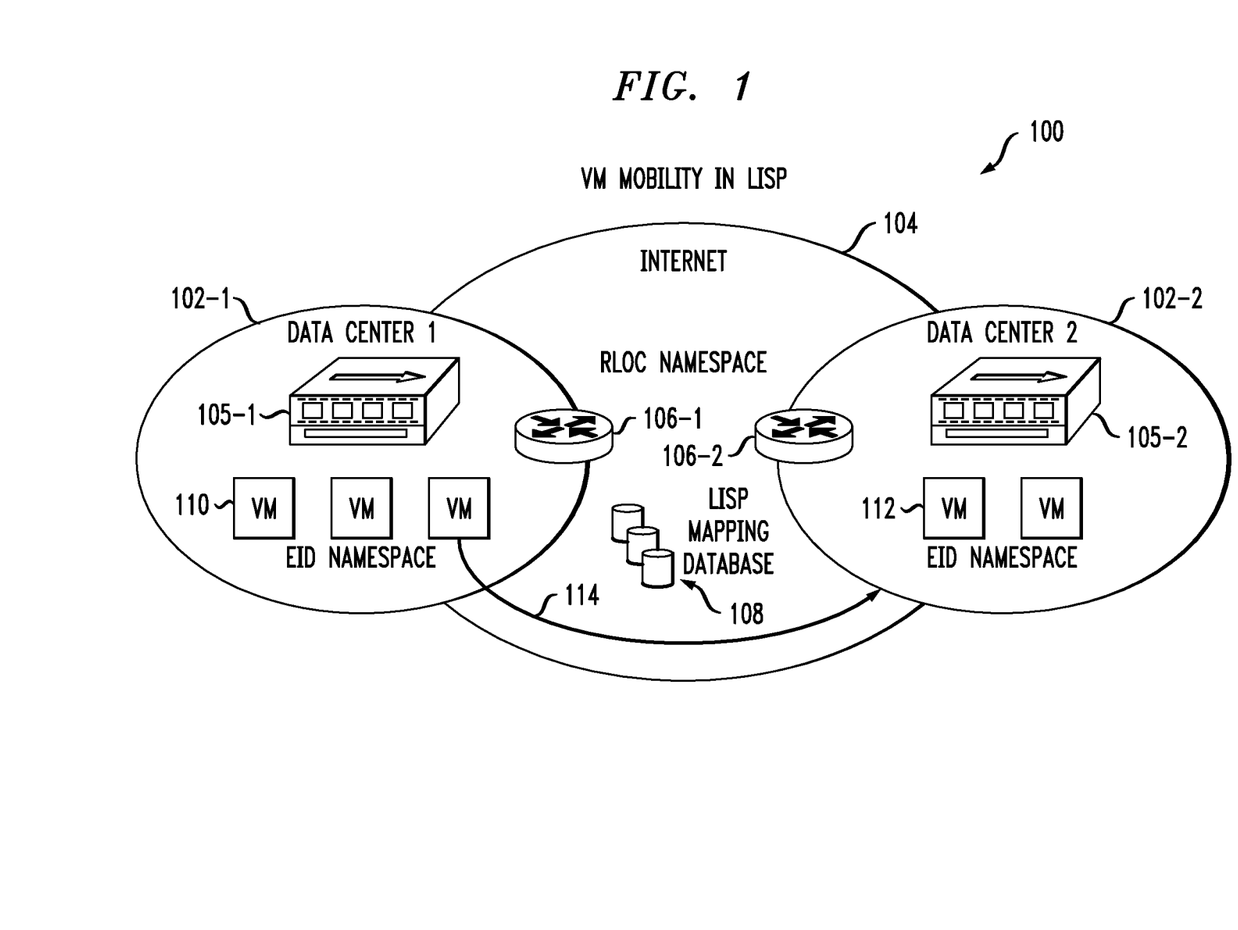
FIG. 1 is a block diagram of an information processing system implementing storage mobility utilizing a locator-identifier separation protocol in an illustrative embodiment of the invention.

FIG. 1 shows an information processing system 100 configured in accordance with an illustrative embodiment of the present invention. The information processing system 100 comprises first and second data centers 102-1 and 102-2, also referred to as Data Center 1 and Data Center 2. The first and second data centers 102-1 and 102-2 are configured to communicate over Internet 104. The first and second data centers 102-1 and 102-2 include respective processing platforms 105-1 and 105-2 and are coupled to the Internet 104 via respective routers 106-1 and 106-2. Associated with the Internet 104 is a LISP mapping database 108 comprising multiple storage devices as shown.

In these and other illustrative embodiments described herein, LISP is assumed without limitation to refer to the Locator/ID Separation Protocol described in D. Farinacci et al., Internet Engineering Task Force (IETF) Request for Comments (RFC) 6830, "The Locator/ID Separation Protocol (LISP)," January 2013, which is incorporated by reference herein. However, it is to be appreciated that other types of protocols involving separation of locator and identifier in network communications can be used. Such protocols are more generally referred to herein as locator-identifier separation protocols, and the LISP protocol described in RFC 6830 is considered an example of a locator-identifier separation protocol.

The information processing system 100 in the present embodiment utilizes the LISP mapping database 108 to control mapping between Endpoint Identifier (EID) namespaces associated with the respective data centers 102-1 and 102-2 and a Routing Locator (RLOC) namespace associated with Internet 104. The use of LISP in this context allows endpoint devices to move within the system 100 without changing their respective EIDs but instead changing only their respective RLOCs. The LISP mapping database 108 stores EID-RLOC mappings that collectively allow each of a plurality of endpoint devices having respective EIDs to be located at different RLOCs within the system.

By way of example, data center 102-1 in the FIG. 1 embodiment comprises a plurality of virtual machines (VMs) 110 that run on processing platform 105-1. Similarly, data center 102-2 comprises a plurality of VMs 112 that run on processing platform 105-2. Each of the VMs 110 and 112 has a corresponding EID within its EID namespace associated with data center 102-1 or data center 102-2. The use of LISP allows the VMs 110 and 112 to migrate between the data centers 102. For example, a given one of the VMs 110 of the first data center 102-1 can migrate to the second data center 102-2 in the direction of the arrow 114. In conjunction with the migration, a corresponding update is made to the appropriate EID-RLOC mapping stored by the LISP mapping database 108.

Although migration of a virtual machine is illustrated in the FIG. 1 embodiment, migration need not exclusively involve virtual machines. For example, other migration scenarios can involve migration of alternative compute instances, which could illustratively comprise so-called "bare metal" elements of the system.

The EIDs and RLOCs are in the form of standard IP addresses. Routers such as routers 106-1 and 106-2 that are arranged between an EID namespace and an RLOC namespace serve as ingress or egress tunnel routers, depending upon the direction of communication. As a given packet traverses an EID namespace, its destination address is an EID, and as the packet traverses an RLOC namespace, its destination address is an RLOC. An ingress tunnel router prepends an LISP header on a given packet received from an EID namespace. The LISP header includes the destination RLOC as determined by the ingress tunnel router from an EID-RLOC mapping in the LISP mapping database 108. The RLOC identifies an egress tunnel router, which strips the LISP header from the packet such that it can be delivered to the destination EID. Accordingly, LISP routers intercept EID-addressed packets and assist in delivering them across the network core where EIDs cannot be routed.

Some embodiments of the invention utilize LISP to facilitate storage mobility within an information processing system such as system 100 comprising data centers 102-1 and 102-2 as previously described.

Figure 2:
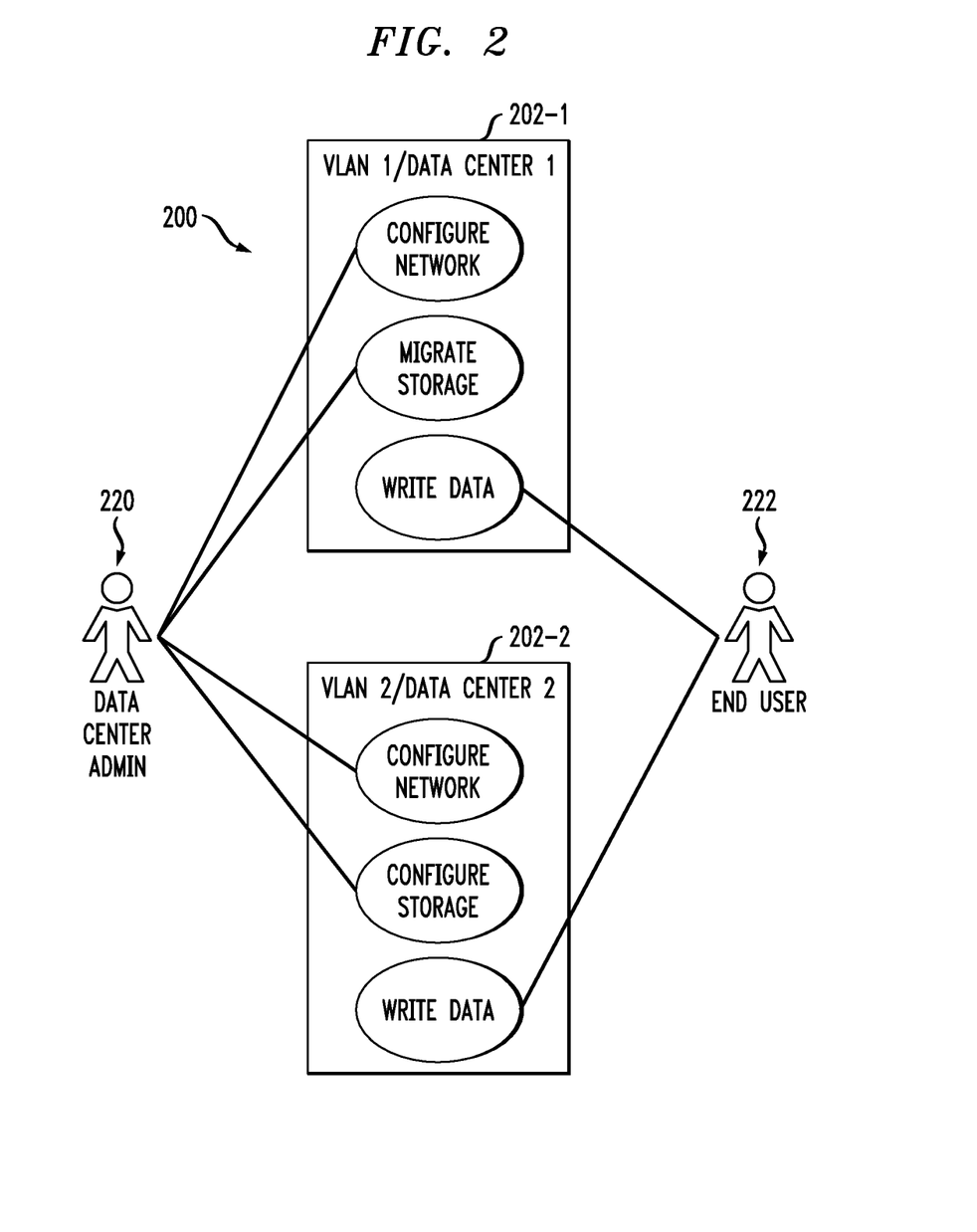
FIG. 2 illustrates an example of a storage migration scenario in an illustrative embodiment.

An example of a storage migration scenario involving an information processing system of this type is shown in FIG. 2. In this embodiment, an information processing system 200 comprises first and second data centers 202-1 and 202-2 that are assumed to be associated with respective distinct virtual local area networks (VLANs) denoted as VLAN 1 and VLAN 2. The system 200 is otherwise configured in a manner substantially the same as that described previously for system 100 of FIG. 1. It is further assumed that the first and second data centers 202-1 and 202-2 are administered by a data center administrator 220. An end user 222 performs write data operations involving at least one storage device of the first data center 202-1. This storage device is to be migrated from the first data center 202-1 to the second data center 202-2. In conjunction with the migration, the data center administrator 220 performs configure network and migrate storage operations in the first data center 202-1 as well as configure network and configure storage operations in the second data center 202-2. These operations performed by the data center administrator 220 complete the migration of the storage device. As a result, the end user 222 can now perform write data operations involving the migrated storage device in the second data center 202-2.

The term "end user" in this context is intended to be broadly construed so as to encompass, for example, human, hardware, software or firmware entities, as well as various combinations of such entities.

Although the example migration in the FIG. 2 embodiment is from a first data center to a second data center, other types of migrations can be addressed in other embodiments, including migration within a given data center. For example, a storage server can be migrated between racks or between rows within a single data center comprising multiple racks of storage equipment arranged in multiple rows. Such a migration within a given data center illustratively maps to movement of at least one virtual machine or movement of at least one compute instance within that data center. Numerous other types of reconfigurations are contemplated.

As mentioned previously, data center reconfigurations involving storage migration can be problematic under current practice, possibly leading to substantial amounts of downtime and associated service disruptions. These drawbacks of conventional arrangements are alleviated in some embodiments through utilization of LISP to facilitate storage mobility within an information processing system such as system 100 or 200. Such facilitation of storage mobility will now be described in greater detail with reference to FIGS. 3 through 6.

Figure 3:
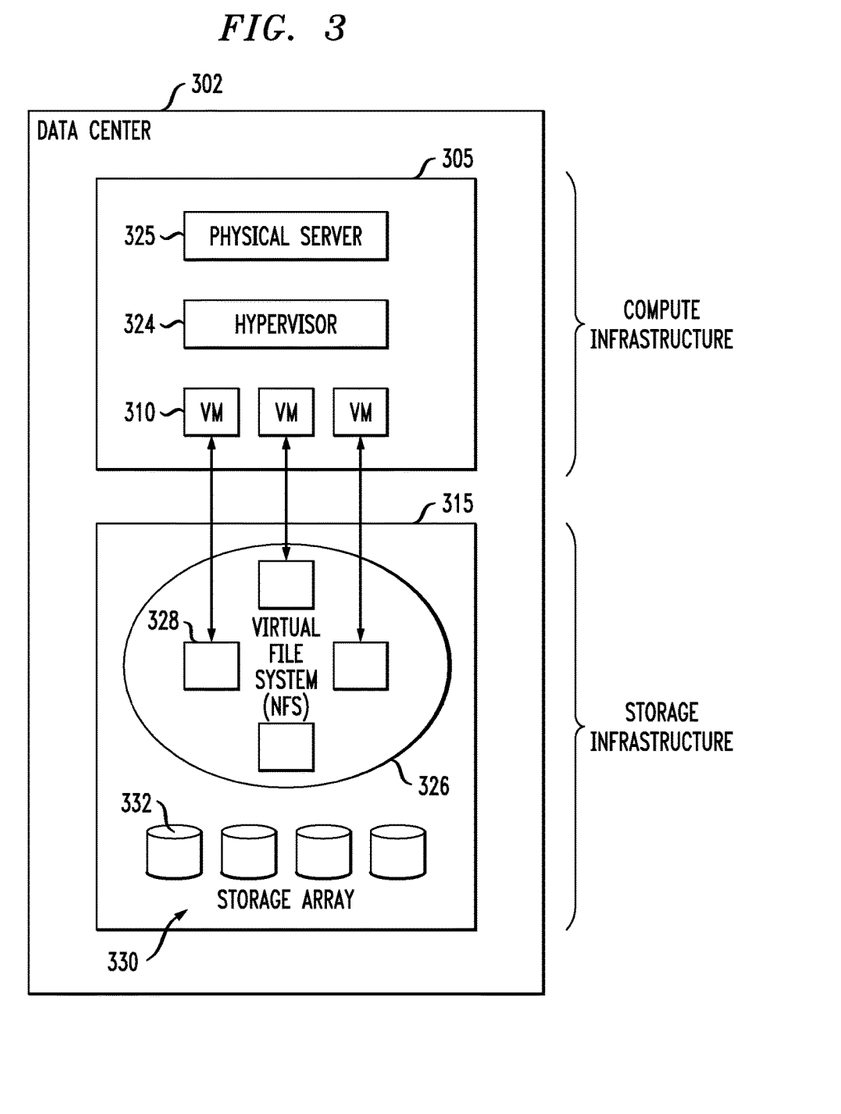
FIG. 3 shows a data center embodiment that is not configured to utilize a locator-identifier separation protocol for storage mobility.

Referring initially to FIG. 3, a data center 302 comprises compute infrastructure 305 including VMs 310 each running a different operating system but sharing a single hardware platform. The VMs 310 interact with storage infrastructure 315. The storage infrastructure 315 comprises a virtual file system 326 that allows the VMs 310 to access multiple file systems as if each of those file systems were locally attached. The storage infrastructure 315 further comprises a storage array 330 comprising multiple storage devices 332.

In the FIG. 3 embodiment, it is assumed for purposes of illustration that the data center 302 is not configured to utilize a locator-identifier separation protocol such as LISP for storage mobility.

The virtual file system 326 in this embodiment is assumed to be based on a Network File System (NFS) protocol and comprises multiple NFS servers 328. NFS is a client-server protocol which offers virtual file system capabilities and hides the location of the files on the network. Also, NFS-mounted file systems contain no information about the file server from which they are mounted. It is to be appreciated, however, that other types of file systems can be used in other embodiments. For example, additional or alternative file systems such as Hadoop Distributed File System (HDFS), General Parallel File System (GPFS), Lustre, PanFS and numerous others can be used in other embodiments, as well as various combinations of two or more of these or other file systems.

In the data center 302, the VMs 310 of the compute infrastructure 305 act as respective NFS clients and interact with the NFS servers 328 of the virtual file system 326. Although not shown as separate elements in the figure, the NFS clients can illustratively be implemented as elements coupled to or otherwise associated with the VMs, as in the embodiment to be described below in conjunction with FIG. 5. The NFS servers 328 illustratively run on one or more appliances or other processing devices coupled to or otherwise associated with the storage array 330. Additionally or alternatively, in some embodiments one or more of the NFS servers 328 can be configured to run directly on the storage array 330.

The NFS servers 328 are examples of what are more generally referred to herein as "storage servers" and the NFS clients associated with respective ones of the VMs 310 are examples of what are more generally referred to herein as "storage clients." Other types and arrangements of storage clients and storage servers can be used in other embodiments. For example, in some embodiments, additional or alternative storage types can be used, such that storage servers and storage clients as those terms are broadly used herein can be extended to operate using one or more of block, object, file and multimedia storage types, as well as other storage types or combinations thereof. Also, in some embodiments, storage clients can be associated with respective compute instances or other types of system elements, in place of or in addition to being associated with respective virtual machines.

It is also be appreciated in this regard that the term "endpoint" as used herein is intended to be broadly construed, and may illustratively comprise a virtual machine, a compute instance or other system element suitable for identification using an endpoint identifier that can be associated with a locator.

The storage array 330 illustratively comprises storage products such as VNX® and Symmetrix VMAX®, both commercially available from EMC Corporation of Hopkinton, Mass. Other types of storage products can be used in implementing storage array 330 or portions thereof, including scale-out network attached storage (NAS) clusters implemented, for example, using Isilon® storage platforms, such as storage platforms comprising Isilon® platform nodes and associated accelerators in the S-Series, X-Series and NL-Series product lines, also commercially available from EMC Corporation. A wide variety of other storage products can be used to implement at least portions of the storage array 330 and its associated NFS servers 328 of virtual file system 326.

An NFS client associated with one of the VMs 310 makes remote procedure calls (RPCs) to one or more of the NFS servers 328 in order to read and write data stored in the storage devices 332 of the storage array 330. A given NFS server creates an NFS share in order to allow its NFS clients to access corresponding data in the storage array 330. A given NFS client associated with one of the VMs 310 mounts this NFS share in order to allow the VM to access the corresponding data via the NFS client and NFS server. The syntax for mounting the NFS share in some embodiments is of the form:

mount <nfs server ip address>:/nfs/server/folder/nfs/client/folder.

It is apparent from the foregoing syntax that mounting of the NFS share utilizes the current IP address of the NFS server. Accordingly, a storage migration of the type previously described in conjunction with FIG. 2 can present considerable difficulties in the context of the exemplary data center 302, in that such a migration involving one of the NFS servers 328 will typically require a change in IP address of the NFS server, such that each of the NFS clients is required to remount the NFS share after the storage migration is complete. Additionally or alternatively, the migration may require a change in a domain name service (DNS) server entry corresponding to the migrated NFS server. As mentioned previously, the NFS clients in this embodiment correspond to respective ones of the VMs 310, and a given data center such as data center 302 can include hundreds or thousands of such virtual machines.

Figure 4:
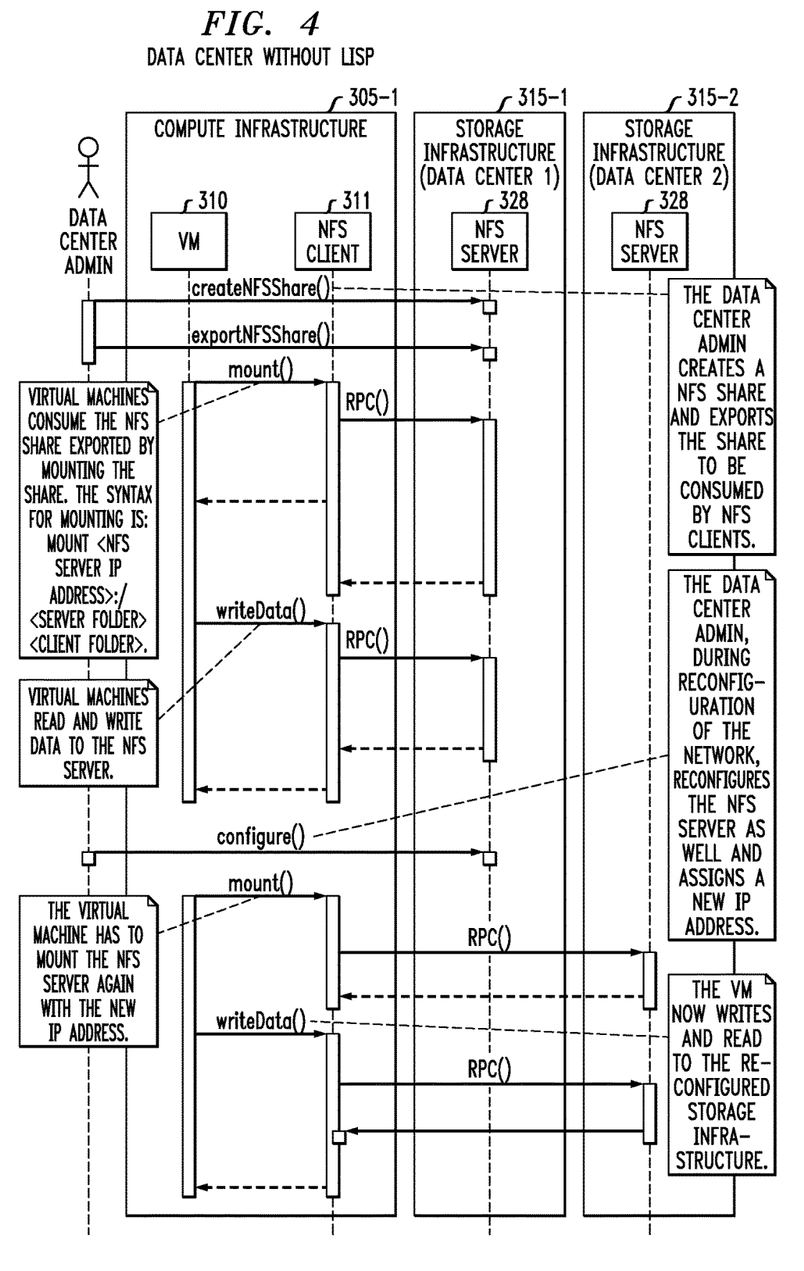
FIG. 4 illustrates a storage migration process involving multiple data centers configured as shown in FIG. 3.

FIG. 4 illustrates a storage migration process involving multiple data centers each configured like the data center 302 of FIG. 3. More particularly, the process of FIG. 4 involves a particular one of the VMs 310 and its associated NFS client 311, both implemented in compute infrastructure 305-1 of a first data center denoted Data Center 1. The diagram in FIG. 4 shows the sequence of events associated with the VM 310 attempting to access a file on an NFS server 328 via the NFS client 311.

Initially, a data center administrator creates an NFS share and exports the share to be consumed by NFS clients and their associated VMs. As noted above, VM 310 is associated with NFS client 311. The VM 310 consumes the exported NFS share by mounting the share, via its associated NFS client 311, using the previously-described syntax of the form mount <nfs server ip address>:/nfs/server/folder/nfs/client/folder, illustratively shown in the figure using the alternative form mount <nfs server ip address>:/<server folder><client folder>. After mounting the NFS share, the VM 310 can read and write data via the NFS client 311 and the NFS server 328.

The storage migration in the FIG. 4 process involves moving at least a portion of the storage infrastructure 315-1 of Data Center 1 to a second data center denoted Data Center 2. As a result of this migration, the NFS server 328 of the storage infrastructure 315-1 of Data Center 1 is moved to storage infrastructure 315-2 of Data Center 2.

In conjunction with the storage migration, the data center administrator performs a network reconfiguration which includes reconfiguring the NFS server 328 and assigning that server a new IP address. The VM 310 therefore has to remount the NFS share, using the new IP address of the NFS server 328. The VM 310 can then once again read and write data via the NFS client 311 and the NFS server 328. As mentioned above, such required remounting of NFS shares in conjunction with storage migration is undesirable, particularly in data centers that include hundreds or thousands of virtual machines.

This remounting problem is advantageously avoided in embodiments in which the data centers are illustratively configured to utilize LISP or another locator-identifier separation protocol in conjunction with storage migration.

Figure 5:
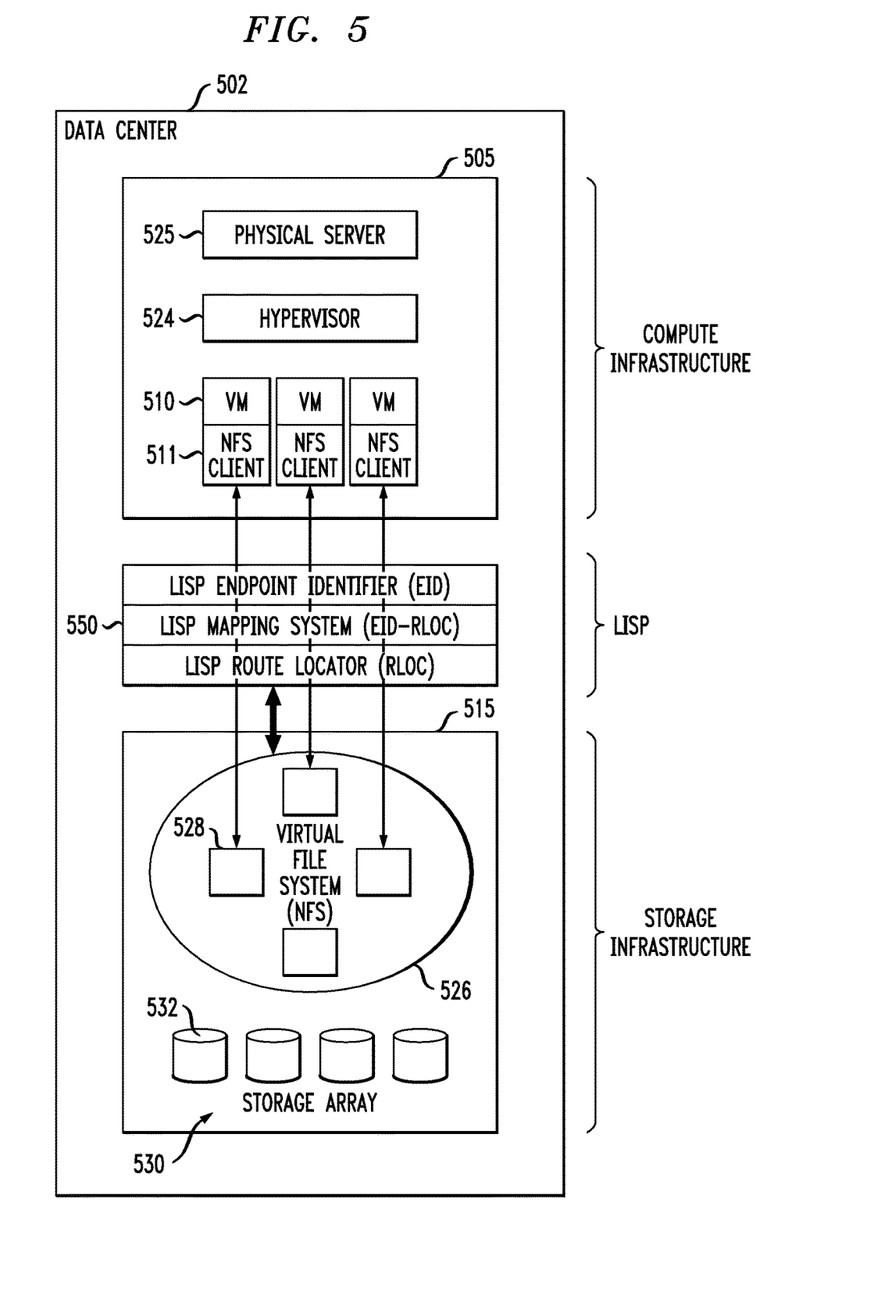
FIG. 5 shows a data center embodiment that is configured to utilize a locator-identifier separation protocol for storage mobility.

Referring now to FIG. 5, a data center 502 comprises compute infrastructure 505 including VMs 510 each running a different operating system but sharing a single hardware platform. Each of the VMs 510 has an associated NFS client 511. The VMs 510 interact with storage infrastructure 515. The storage infrastructure 515 comprises a virtual file system 526 that allows the VMs 510 to access multiple file systems as if each of those file systems were locally attached. The storage infrastructure 515 further comprises a storage array 530 comprising multiple storage devices 532.

In the FIG. 5 embodiment, it is assumed for purposes of illustration that the data center 502 is configured to utilize a locator-identifier separation protocol such as LISP for storage mobility. As will be described, this embodiment avoids the need to remount NFS shares upon migration or other types of reconfiguration of data center storage infrastructure comprising one or more NFS servers.

The virtual file system 526 in this embodiment is assumed to be based on an NFS protocol and comprises multiple NFS servers 528. Again, other types of file systems can be used in other embodiments.

In the data center 502, the VMs 510 of the compute infrastructure 505 are associated with respective clients 511 that interact with the NFS servers 528 of the virtual file system 526 via a LISP mapping system 550. The NFS servers 528 illustratively run on one or more appliances or other processing devices coupled to or otherwise associated with the storage array 530. Additionally or alternatively, in some embodiments one or more of the NFS servers 528 can be configured to run directly on the storage array 530.

An NFS client associated with one of the VMs 510 makes RPCs to one or more of the NFS servers 528 in order to read and write data stored in the storage devices 532 of the storage array 530. A given NFS server creates an NFS share in order to allow its NFS clients to access corresponding data in the storage array 530. A given NFS client associated with one of the VMs 510 mounts this NFS share in order to access the corresponding data, using the NFS share mounting syntax as previously described.

The LISP mapping system 550 is arranged between the NFS clients 511 and the NFS servers 528 of the virtual file system 526. The LISP mapping system 550 in this embodiment performs EID-RLOC mapping using a mapping database such as LISP mapping database 108 of FIG. 1. More particularly, the LISP mapping system 550 mediates between LISP EIDs from an EID namespace and RLOCs of an RLOC namespace. This illustratively involves mapping EIDs to RLOCs in order to support communication between NFS clients in one data center and NFS servers in another data center.

It should be recognized that the LISP mapping system 550 within a given data center such as data center 502 may comprise a portion of a larger system that is shared among multiple data centers. For example, such a system illustratively comprises a LISP mapping database and one or more associated network devices that are part of the Internet or another network supporting communication between the multiple data centers.

The LISP mapping system 550 in some embodiments is part of a LISP processor implemented on one or more routers. For example, the LISP mapping system 550 illustratively comprises at least a portion of one or more routers such as routers 106-1 and 106-2 in the FIG. 1 embodiment, operating as ingress or egress tunnel routers separating an RLOC namespace from one or more EID namespaces. The associated LISP mapping database 108 may be part of the LISP mapping system 550 or implemented at least in part as a separate system component. Numerous other arrangements of one or more network devices or more generally processing devices may be used to implement the LISP mapping system 550.

Figure 6:
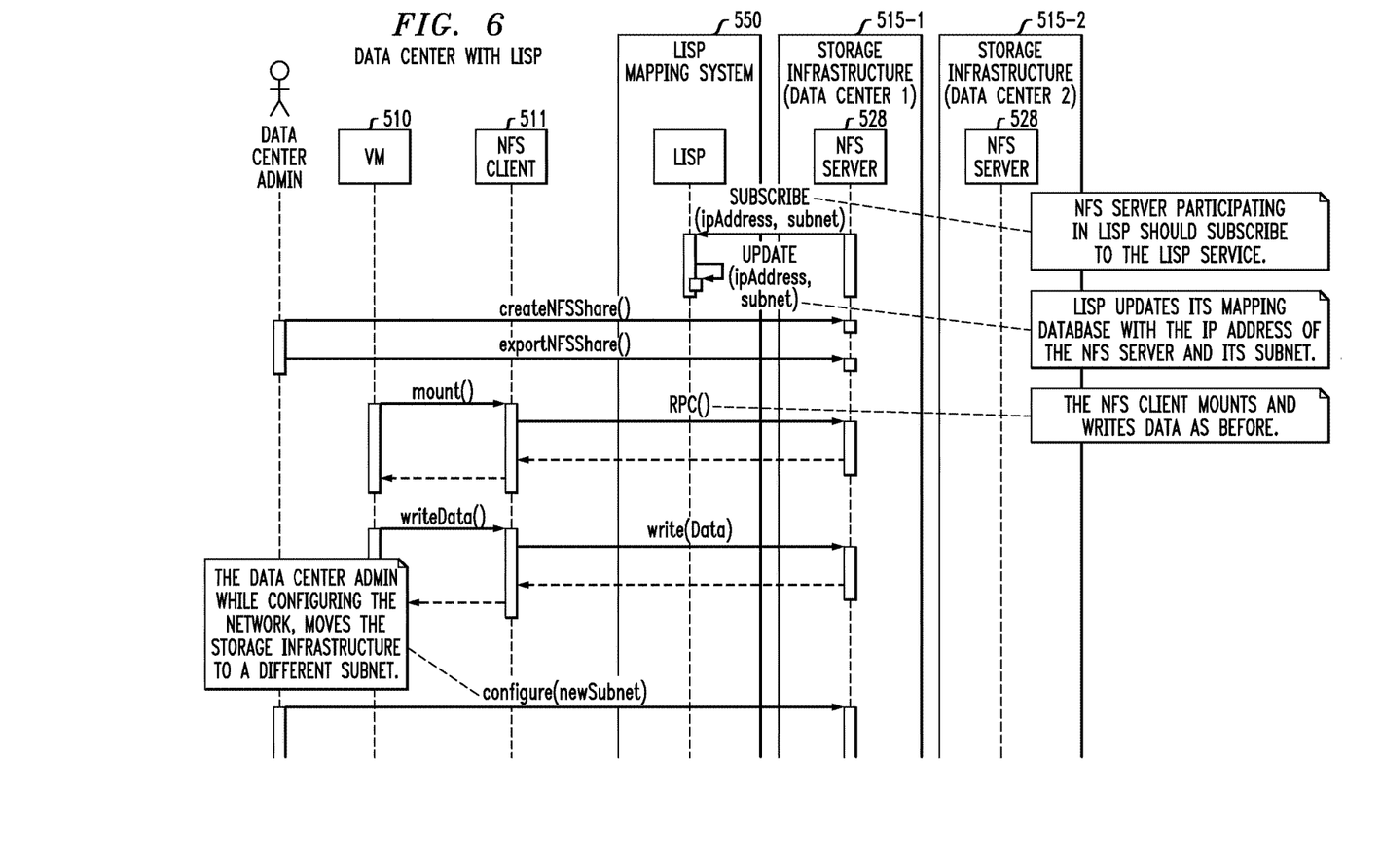
FIG. 6 illustrates a storage migration process involving multiple data centers configured as shown in FIG. 5.

FIG. 6 illustrates a storage migration process involving multiple data centers each configured like the data center 502 of FIG. 5. More particularly, the process of FIG. 6 involves a particular one of the VMs 510 and its associated NFS client 511, both implemented in compute infrastructure 505-1 of a first data center denoted Data Center 1. The diagram in FIG. 6 shows the sequence of events associated with the VM 510 attempting to access a file on an NFS server 528 via the NFS client 511.

Initially, the NFS server 528 participates in LISP functionality by subscribing to the LISP service provided by the LISP mapping system 550. The LISP mapping system 550 then updates the mapping database with the IP address of the NFS server 528 and its subnet. A data center administrator creates an NFS share and exports the share to be consumed by NFS clients and their associated VMs. As noted above, VM 510 is associated with NFS client 511. The VM 510 consumes the exported NFS share by mounting the share, via its NFS client 511, using the previously-described syntax of the form mount <nfs server ip address>:/nfs/server/folder /nfs/client/folder. After mounting the NFS share, the VM 510 can read and write data via the NFS client 511 and the NFS server 528.

The storage migration in the FIG. 6 process involves moving at least a portion of the storage infrastructure 515-1 of Data Center 1 to a second data center denoted Data Center 2. As a result of this migration, the NFS server 528 of the storage infrastructure 515-1 of Data Center 1 is moved to storage infrastructure 515-2 of Data Center 2.

In conjunction with the storage migration, the data center administrator performs a network reconfiguration which includes moving the NFS server 528 to a new subnet. However, a new IP address is not assigned to the NFS server 528. During the migration, the LISP mapping system 550 locks the NFS server 528 for any writes by the NFS clients thereby guaranteeing atomicity for all transactions between the NFS clients and the NFS server 528. The NFS server, after the migration, will subscribe to the LISP service again, so the LISP mapping system 550 can update its mapping database with the new subnet location. After updating its mapping database, the LISP mapping system 550 unlocks the NFS server 528 so the NFS clients can continue reading and writing data via the NFS server 528 as before.

Accordingly, in the embodiments described in conjunction with FIGS. 5 and 6, the VM 510 does not have to remount the NFS share, as the IP address of the NFS server 528 remains unchanged despite the storage migration. The VM 510 can therefore continue to read and write data via NFS client 511 and NFS server 528 without the need to remount the NFS share each time the storage infrastructure is migrated or otherwise reconfigured. This provides a significant advantage over conventional storage migration techniques, particularly in data centers that include hundreds or thousands of virtual machines. For example, downtime associated with storage migration or other reconfigurations of storage infrastructure is considerably reduced, leading to improved continuity of service within the system.

In the embodiments of FIGS. 5 and 6, the LISP mapping system 550 provides a level of indirection between the NFS clients 511 and the NFS servers 528. The NFS servers 528 first participate in LISP by subscribing to the LISP service. The LISP mapping system 550 utilizes EID-RLOC mapping entries to persist mappings between the IP addresses of the NFS servers and the subnets of those storage servers. This not only allows the NFS server identity as expressed in its EID to be separated from its location but also allows routing to be performed based on local subnet instances persisted in the mapping database.

Storage servers such as NFS servers 528 or other types of storage infrastructure subject to migration or other types of reconfiguration in a given embodiment can include both single-homed and multi-homed devices, in any combinations. The disclosed techniques advantageously provide enhanced flexibility in storage mobility and reconfiguration in both single-homed and multi-homed environments.

Figure 7:
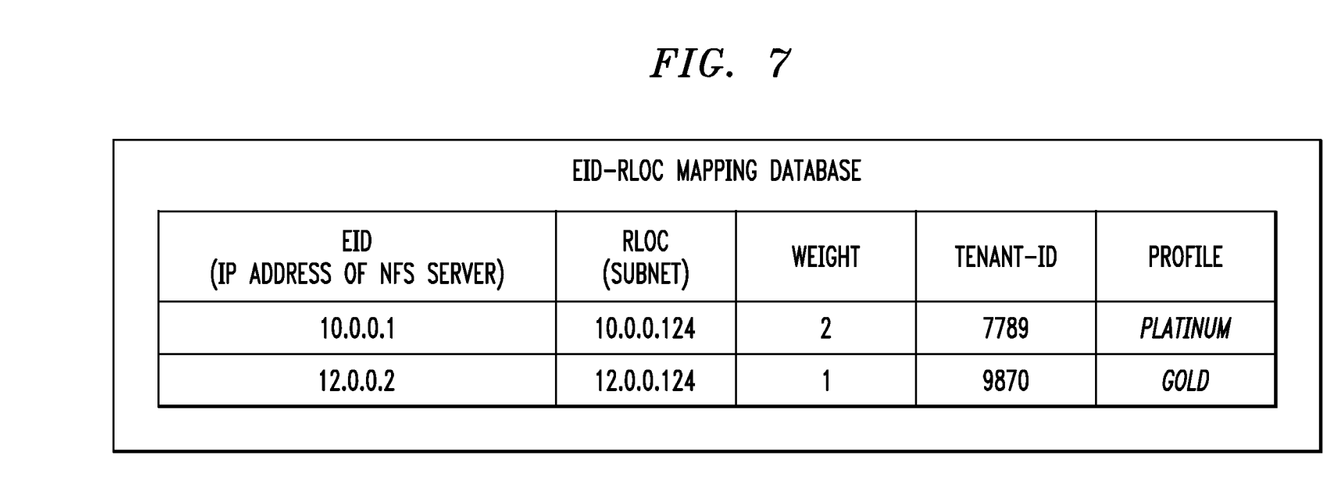
FIG. 7 shows example entries in a mapping database of the FIG. 1 system.

FIG. 7 illustrates example entries in an EID-RLOC mapping database utilized by the LISP mapping system 550 in the embodiments of FIGS. 5 and 6. The mapping database in this embodiment comprises a plurality of EID-RLOC mapping entries. The EID-RLOC mapping entries more particularly comprise respective EIDs in the form of IP addresses of respective ones of the NFS servers 528, and RLOCs denoting subnets associated with the corresponding EIDs. The EID-RLOC mapping entries include not only EIDs and RLOCs that are used to facilitate storage mobility as previously described in conjunction with FIGS. 5 and 6, but also additional information that supports additional functionality for policy configuration and management of storage traffic.

For example, assume that the data centers comprise one or more clouds hosting multiple tenants that share cloud resources. A given tenant could be an organization or a group of users within an organization. In many cases, a tenant would like to have its own dedicated portion of the storage infrastructure of the cloud for performance or security reasons. The LISP mapping system 550 in such an arrangement allows a given tenant to be isolated and have its own dedicated NFS server or NFS servers, such that performance and security goals of the tenant can be more readily achieved. In the FIG. 7 mapping database, EID-RLOC mapping entries are additionally associated with particular tenant identifiers ("tenant-id") as shown, such that one or more NFS servers can be assigned to individual tenants.

Additionally or alternatively, different levels of Quality of Service (QoS) can be provided to tenants. For example, a tenant in the cloud can be classified based on the service offered to the tenant, such as services in a hierarchy of levels illustratively including "platinum," "gold" and "silver" levels. As shown in FIG. 7, the EID-RLOC entry for tenant-id 7789 indicates a platinum level and the EID-RLOC entry for tenant-id 9870 indicates a gold level. These different service levels have different weights for storage service, with the platinum level having a weight of 2 and the gold level having a weight of 1. The LISP mapping system 550 is configured to enforce the weightings associated with the different service levels as identified in the additional information in the EID-RLOC entries.

Numerous other policies can be specified and enforced for different cloud tenants in this manner, including access control and other types of security policies. More generally, EID-RLOC entries can be supplemented with tenant profile information that allows implementation of policies relating to QoS, security or other factors.

It should be understood that the particular sets of modules and other components implemented in the systems 100 and 200 and the data centers 102, 202, 302 and 502 as described above are presented by way of example only. In other embodiments, only subsets of these components, or additional or alternative sets of components, may be used, and such components may exhibit alternative functionality and configurations.

Also, the particular processing operations and other system functionality described in conjunction with the diagrams of FIGS. 4 and 6 are presented by way of illustrative example only, and should not be construed as limiting the scope of the invention in any way. Alternative embodiments can use other types of processing operations involving one or more data centers or other information processing system components. For example, the ordering of the process steps may be varied in other embodiments, or certain steps may be performed concurrently with one another rather than serially. In addition, at least a subset of the process steps may be repeated periodically for different storage migrations or other system reconfigurations.

It is to be appreciated that functionality such as that described in conjunction with the diagrams of FIGS. 4 and 6 can be implemented at least in part in the form of one or more software programs stored in memory and executed by a processor of a processing device such as a computer or server. A memory or other storage device having executable program code of one or more software programs embodied therein is an example of what is more generally referred to herein as a "processor-readable storage medium."

Communications between the various elements of an information processing system as disclosed herein may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

The data centers disclosed herein are illustratively implemented using one or more processing platforms, examples of which will be now be described in greater detail. A given such processing platform comprises at least one processing device comprising a processor coupled to a memory, and the processing device may be implemented at least in part utilizing one or more virtual machines.

As mentioned previously, portions of an information processing system as disclosed herein illustratively comprise cloud infrastructure. The cloud infrastructure comprises virtual machines implemented using a hypervisor. The hypervisor runs on physical infrastructure. The cloud infrastructure further comprises sets of applications running on respective ones of the virtual machines under the control of the hypervisor.

Although only a single hypervisor 324 or 524 is shown in the respective data center embodiments of FIGS. 3 and 5, a given data center may of course include multiple hypervisors each providing a set of virtual machines using at least one underlying physical machine. Different sets of virtual machines provided by one or more hypervisors may be utilized in configuring different portions of a given data center.

An example of a commercially available hypervisor platform that may be used to implement hypervisor 324 or 524 and possibly other portions of a data center in one or more embodiments of the invention is the VMware® vSphere® which may have an associated virtual infrastructure management system such as the VMware® vCenter™.

One or more of the processing modules or other components of an information processing system as disclosed herein may therefore each run on a computer, server, storage device or other processing platform element. A given such element may be viewed as an example of what is more generally referred to herein as a "processing device."

The cloud infrastructure described above may represent at least a portion of one processing platform. Another example of such a processing platform is a plurality of processing devices which communicate with one another over a network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

Also included in the processing device is network interface circuitry, which is used to interface the processing device with the network and other system components, and may comprise conventional transceivers.

The particular processing platforms described above are presented by way of example only, and a given information processing system such as system 100 or 200, or systems comprising one or more instances of at least one of data centers 302 and 502, may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

It should again be emphasized that the above-described embodiments of the invention are presented for purposes of illustration only. Many variations and other alternative embodiments may be used. For example, the disclosed techniques are applicable to a wide variety of other types of information processing systems, data centers, file systems, compute infrastructure and storage infrastructure that can benefit from the enhanced flexibility provided in storage mobility and other types of storage reconfiguration. Also, the particular configurations of system and device elements shown in FIGS. 1, 2, 3 and 5, the particular process operations shown in FIGS. 4 and 6, and the particular mapping entry formats shown in FIG. 7, can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:

a processing device comprising a processor coupled to a memory;

the processing device implementing a locator-identifier mapping system configured to associate identifiers of respective endpoints with respective locators in accordance with a locator-identifier separation protocol;

wherein a first one of the endpoints comprises a storage server associated with a storage array;

wherein in conjunction with a reconfiguration of the storage server, the locator-identifier mapping system updates a particular one of the locators corresponding to the endpoint identifier of the storage server;

wherein the locator-identifier mapping system comprises a mapping database having a plurality of entries each comprising one of the endpoint identifiers in association with one of the locators;

wherein each of at least a subset of the entries of the mapping database further comprises a tenant identifier and corresponding tenant profile information;

wherein the tenant identifier in a given one of the entries of the mapping database identifies a tenant of cloud infrastructure that uses a storage server identified by the endpoint identifier in the given one of the entries of the mapping database;

wherein the tenant profile information in the given one of the entries of the mapping database is utilized to control implementation of one or more policies relating to at least one of service level and security level for the tenant having the tenant identifier in the given one of the entries of the mapping database;

wherein the given one of the entries of the mapping database further comprises a weight value utilized in controlling implementation of at least one of the one or more policies relating to at least one of service level and security level for the tenant having the tenant identifier in the given one of the entries of the mapping database;

wherein associating identifiers of respective endpoints with respective locators further comprises:

receiving a first subscription request from the storage server, the subscription request specifying the endpoint identifier of the storage server and a current subnet of the storage server; and associating the endpoint identifier of the storage server with a locator specifying the current subnet of the storage server; and wherein updating the particular one of the locators further comprises:

responsive to the reconfiguration, locking the storage server to prevent writes by any associated storage clients;

receiving a second subscription request from the storage server, the second subscription request specifying the endpoint identifier of the storage server and an updated subnet of the storage server;

updating the locator corresponding to the endpoint identifier of the storage server to specify the updated subnet of the storage server; and unlocking the storage server to allow writes by any associated storage clients.

2. The apparatus of claim 1 wherein the reconfiguration of the storage server comprises at least one of a migration of the storage server within a given data center and a migration of the storage server from a first data center to a second data center.

3. The apparatus of claim 1 wherein the processing device comprises a router configured to operate as at least one of an ingress tunnel router and an egress tunnel router in accordance with the locator-identifier separation protocol.

4. The apparatus of claim 1 wherein the locator-identifier separation protocol comprises Locator/ID Separation Protocol (LISP).

5. The apparatus of claim 4 wherein the identifiers comprise respective LISP EIDs and the locators comprise respective LISP RLOCs.

6. The apparatus of claim 1 wherein the tenant profile information comprises a profile identifier and the profile identifier identifies a level of service to be provided to the tenant identified by the tenant identifier.

7. The apparatus of claim 1 wherein the first endpoint comprising the storage server is configured to communicate with a second one of the endpoints having an associated storage client.

8. The apparatus of claim 7 wherein the storage server and the storage client are configured to utilize at least one of block, object, file and multimedia storage types.

9. The apparatus of claim 1 wherein the apparatus is implemented in a processing platform comprising a plurality of processing devices.

10. A method comprising:

associating identifiers of respective endpoints with respective locators in accordance with a locator-identifier separation protocol; and in conjunction with a reconfiguration of a first one of the endpoints comprising a storage server associated with a storage array, updating a particular one of the locators corresponding to the endpoint identifier of the storage server;

wherein the associating and updating are performed by a locator-identifier mapping system implemented by at least one processing device, said at least one processing device comprising a processor coupled to a memory;

wherein the locator-identifier mapping system comprises a mapping database having a plurality of entries each comprising one of the endpoint identifiers in association with one of the locators;

wherein each of at least a subset of the entries of the mapping database further comprises a tenant identifier and corresponding tenant profile information;

wherein the tenant identifier in a given one of the entries of the mapping database identifies a tenant of cloud infrastructure that uses a storage server identified by the endpoint identifier in the given one of the entries of the mapping database;

wherein the tenant profile information in the given one of the entries of the mapping database is utilized to control implementation of one or more policies relating to at least one of service level and security level for the tenant having the tenant identifier in the given one of the entries of the mapping database;

wherein the given one of the entries of the mapping database further comprises a weight value utilized in controlling implementation of at least one of the one or more policies relating to at least one of service level and security level for the tenant having the tenant identifier in the given one of the entries of the mapping database;

wherein the associating further comprises:

receiving a first subscription request from the storage server, the subscription request specifying the endpoint identifier of the storage server and a current subnet of the storage server; and associating the endpoint identifier of the storage server with a locator specifying the current subnet of the storage server; and wherein the updating further comprises:

responsive to the reconfiguration, locking the storage server to prevent writes by any associated storage clients;

receiving a second subscription request from the storage server, the second subscription request specifying the endpoint identifier of the storage server and an updated subnet of the storage server;

updating the locator corresponding to the endpoint identifier of the storage server to specify the updated subnet of the storage server; and unlocking the storage server to allow writes by any associated storage clients.

11. The method of claim 10 wherein the associating further comprises maintaining the mapping database.

12. An article of manufacture comprising a non-transitory processor-readable storage medium having stored therein program code of one or more software programs, wherein the program code when executed by at least one processing device comprising a processor coupled to a memory causes said at least one processing device:

to associate identifiers of respective endpoints with respective locators in accordance with a locator-identifier separation protocol; and in conjunction with a reconfiguration of a first one of the endpoints comprising a storage server associated with a storage array, to update a particular one of the locators corresponding to the endpoint identifier of the storage server;

wherein the associating and updating are performed by a locator-identifier mapping system implemented by said at least one processing device;

wherein the locator-identifier mapping system comprises a mapping database having a plurality of entries each comprising one of the endpoint identifiers in association with one of the locators;

wherein each of at least a subset of the entries of the mapping database further comprises a tenant identifier and corresponding tenant profile information;

wherein the tenant identifier in a given one of the entries of the mapping database identifies a tenant of cloud infrastructure that uses a storage server identified by the endpoint identifier in the given one of the entries of the mapping database;

wherein the tenant profile information in the given one of the entries of the mapping database is utilized to control implementation of one or more policies relating to at least one of service level and security level for the tenant having the tenant identifier in the given one of the entries of the mapping database;

wherein the given one of the entries of the mapping database further comprises a weight value utilized in controlling implementation of at least one of the one or more policies relating to at least one of service level and security level for the tenant having the tenant identifier in the given one of the entries of the mapping database;

wherein the associating further comprises:

receiving a first subscription request from the storage server, the subscription request specifying the endpoint identifier of the storage server and a current subnet of the storage server; and associating the endpoint identifier of the storage server with a locator specifying the current subnet of the storage server; and wherein the updating further comprises:

responsive to the reconfiguration, locking the storage server to prevent writes by any associated storage clients;

receiving a second subscription request from the storage server, the second subscription request specifying the endpoint identifier of the storage server and an updated subnet of the storage server;

updating the locator corresponding to the endpoint identifier of the storage server to specify the updated subnet of the storage server; and unlocking the storage server to allow writes by any associated storage clients.

13. An information processing system comprising:

a plurality of endpoints implemented on respective processing devices; and at least one additional processing device coupled to the endpoints and implementing a locator-identifier mapping system configured to associate identifiers of respective ones of the endpoints with respective locators in accordance with a locator-identifier separation protocol;

wherein a first one of the endpoints comprises a storage server associated with a storage array;

wherein in conjunction with a reconfiguration of the storage server, the locator-identifier mapping system updates a particular one of the locators corresponding to the endpoint identifier of the storage server;

wherein the locator-identifier mapping system comprises a mapping database having a plurality of entries each comprising one of the endpoint identifiers in association with one of the locators;

wherein each of at least a subset of the entries of the mapping database further comprises a tenant identifier and corresponding tenant profile information;

wherein the tenant identifier in a given one of the entries of the mapping database identifies a tenant of cloud infrastructure that uses a storage server identified by the endpoint identifier in the given one of the entries of the mapping database;

wherein the tenant profile information in the given one of the entries of the mapping database is utilized to control implementation of one or more policies relating to at least one of service level and security level for the tenant having the tenant identifier in the given one of the entries of the mapping database;

wherein the given one of the entries of the mapping database further comprises a weight value utilized in controlling implementation of at least one of the one or more policies relating to at least one of service level and security level for the tenant having the tenant identifier in the given one of the entries of the mapping database;

wherein associating identifiers of respective endpoints with respective locators further comprises:

receiving a first subscription request from the storage server, the subscription request specifying the endpoint identifier of the storage server and a current subnet of the storage server; and associating the endpoint identifier of the storage server with a locator specifying the current subnet of the storage server; and wherein updating the particular one of the locators further comprises:

responsive to the reconfiguration, locking the storage server to prevent writes by any associated storage clients;

receiving a second subscription request from the storage server, the second subscription request specifying the endpoint identifier of the storage server and an updated subnet of the storage server;

updating the locator corresponding to the endpoint identifier of the storage server to specify the updated subnet of the storage server; and unlocking the storage server to allow writes by any associated storage clients.

14. The method of claim 10 wherein the tenant profile information comprises a profile identifier and the profile identifier identifies a level of service to be provided to the tenant identified by the tenant identifier.

15. The article of manufacture of claim 12 wherein the tenant profile information comprises a profile identifier and the profile identifier identifies a level of service to be provided to the tenant identified by the tenant identifier.

16. The information processing system of claim 13 wherein the tenant profile information comprises a profile identifier and the profile identifier identifies a level of service to be provided to the tenant identified by the tenant identifier.

17. The method of claim 10 wherein the reconfiguration of the storage server comprises at least one of a migration of the storage server within a given data center and a migration of the storage server from a first data center to a second data center.

18. The article of manufacture of claim 12 wherein the reconfiguration of the storage server comprises at least one of a migration of the storage server within a given data center and a migration of the storage server from a first data center to a second data center.

19. The information processing system of claim 13 wherein the reconfiguration of the storage server comprises at least one of a migration of the storage server within a given data center and a migration of the storage server from a first data center to a second data center.

20. The information processing system of claim 13 wherein the first endpoint comprising the storage server is configured to communicate with a second one of the endpoints having an associated storage client.

* * * * *